United States Patent
Liu et al.

(10) Patent No.: US 10,225,367 B2
(45) Date of Patent: Mar. 5, 2019

(54) METHOD AND DEVICE FOR GENERATING FORWARDING INFORMATION

(71) Applicant: Huawei Technologies Co., Ltd., Shenzhen (CN)

(72) Inventors: Shucheng Liu, Shenzhen (CN); Yong Huang, Shenzhen (CN); Jing Ren, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 409 days.

(21) Appl. No.: 15/015,705

(22) Filed: Feb. 4, 2016

(65) Prior Publication Data

US 2016/0156736 A1    Jun. 2, 2016

Related U.S. Application Data

(63) Continuation of application No. PCT/CN2014/081819, filed on Jul. 8, 2014.

(30) Foreign Application Priority Data

Aug. 8, 2013  (CN) .......................... 2013 1 0344560

(51) Int. Cl.
*H04L 29/08* (2006.01)
*H04L 12/46* (2006.01)
(Continued)

(52) U.S. Cl.
CPC ........ *H04L 67/327* (2013.01); *H04L 12/4633* (2013.01); *H04L 41/12* (2013.01);
(Continued)

(58) Field of Classification Search
None
See application file for complete search history.

(56) References Cited

U.S. PATENT DOCUMENTS 7,209,977 B2 *  4/2007  Acharya ........... H04L 29/12009
                                                      370/395.3
2003/0099237 A1   5/2003  Mitra et al.
(Continued)

FOREIGN PATENT DOCUMENTS

| CN | 101534241 A | 9/2009 |
| CN | 101667885 A | 3/2010 |
| CN | 102638405 A | 8/2012 |

OTHER PUBLICATIONS

"OpenFlow Switch Specification," Version 1.3.2 (Wire Protocol 0x04), Open Networking Foundation (Apr. 25, 2013).

*Primary Examiner* — Shirley X Zhang
(74) *Attorney, Agent, or Firm* — Leydig, Voit & Mayer, Ltd.

(57) ABSTRACT

The present application discloses a method and device for generating forwarding information. The method includes generating first forwarding information including first matching information and first operating information for a first forwarding device, the first operating information is used for instructing the first forwarding device to encapsulate a first label for a first data message; generating second forwarding information including second matching information and second operating information for the second forwarding device, wherein the second operating information is used for instructing the second forwarding device to receive the first encapsulation message encapsulated with the first label; and generating third forwarding information including the second matching information and third operating information for the third forwarding device, wherein the third operating information is used for instructing the third forwarding device to obtain the first data message encapsulated in the first encapsulation message and carrying the first content by de-encapsulation.

15 Claims, 5 Drawing Sheets

(51) Int. Cl.
*H04L 12/24* (2006.01)
*H04L 12/721* (2013.01)
*H04L 12/781* (2013.01)
*H04L 12/715* (2013.01)
*H04L 12/717* (2013.01)
*H04L 12/723* (2013.01)

(52) U.S. Cl.
CPC .............. *H04L 45/38* (2013.01); *H04L 45/42* (2013.01); *H04L 45/50* (2013.01); *H04L 45/52* (2013.01); *H04L 45/64* (2013.01)

(56) References Cited

U.S. PATENT DOCUMENTS

| | | | |
|---|---|---|---|
| 2006/0165053 A1* | 7/2006 | Bhatnagar | H04L 67/02 370/351 |
| 2007/0189312 A1* | 8/2007 | Acharya | H04L 29/12009 370/401 |
| 2010/0195654 A1* | 8/2010 | Jacobson | H04L 45/7457 370/392 |
| 2011/0004699 A1* | 1/2011 | Han | H04L 67/104 709/235 |
| 2011/0261812 A1* | 10/2011 | Kini | H04L 12/4633 370/389 |
| 2011/0271007 A1* | 11/2011 | Wang | H04L 45/306 709/238 |
| 2012/0005371 A1* | 1/2012 | Ravindran | H04L 45/50 709/242 |
| 2012/0136945 A1* | 5/2012 | Lee | H04L 67/2838 709/206 |
| 2012/0204224 A1 | 8/2012 | Wang et al. | |
| 2013/0111063 A1 | 5/2013 | Lee | |
| 2013/0227166 A1* | 8/2013 | Ravindran | H04L 67/327 709/238 |
| 2013/0282920 A1* | 10/2013 | Zhang | H04L 45/74 709/238 |
| 2013/0322451 A1* | 12/2013 | Wang | H04L 45/306 370/392 |
| 2014/0023075 A1* | 1/2014 | Calo | H04L 45/34 370/392 |
| 2015/0032892 A1* | 1/2015 | Narayanan | H04L 47/70 709/226 |
| 2015/0095514 A1* | 4/2015 | Yu | H04W 4/70 709/242 |
| 2016/0036730 A1* | 2/2016 | Kutscher | H04L 45/38 370/401 |

* cited by examiner

METHOD AND DEVICE FOR GENERATING FORWARDING INFORMATION

CROSS-REFERENCE TO RELATED APPLICATIONS

This application is a continuation of International Patent Application No. PCT/CN2014/081819, filed on Jul. 8, 2014, which claims priority to Chinese Patent Application No. 201310344560.4, filed on Aug. 8, 2013, both of which are hereby incorporated by reference in their entireties.

TECHNICAL FIELD

The present application relates to the field of communications, and particularly, to a method and device for generating forwarding information.

BACKGROUND

Information centric network (ICN) is a network technology performing optimization directly for submission of content. It acquires great attention since the ICN network can route based on a name of content and quickly respond to a content request by means of a cache in the network, thus attracting great attention and possibly replacing the traditional uniform resource locator (URL) solution.

Currently, the ICN network has been basically completed, and the ICN network can be well supported in the existing network architecture by means of the software defined networking (SDN) technology. However, the ICN network has a variety of implementation solutions, and different network device manufacturers use different implementation manners, thus the ICN network architecture of one implementation manner is not applicable to the ICN network architectures of other implementation manners.

SUMMARY

The technical problem to be mainly solved in the present application is to provide a method and device for generating forwarding information, which can achieve compatibility of information centric networks with different protocols.

To solve the above-mentioned technical problem, the first aspect of the present application provides a method for generating forwarding information, including: receiving, by a generating device, a first request message used for requesting a first content for a first network element, wherein the first request message includes a first content identifier; determining, by the generating device, that a second network element is a provider of the first content according to obtained first registration information, wherein the first registration information includes information indicating that the second network element is the provider of the first content, and the first registration information includes the first content identifier; determining, by the generating device, a first path from the second network element to the first network element according to network topology, wherein the first path includes a first forwarding device, a second forwarding device and a third forwarding device, the first forwarding device is a forwarding device adjacent to the second network element on the first path, the third forwarding device is a forwarding device adjacent to the first network element on the first path, and the second forwarding device is a forwarding device located between the first forwarding device and the third forwarding device on the first path; generating, by the generating device, first forwarding information including first matching information and first operating information for the first forwarding device, wherein the first matching information includes an identifier of a protocol of the first request message and a first identifier of the first content, the first operating information is used for instructing the first forwarding device to encapsulate a first label for a first data message to obtain a first encapsulation message after determining that the received first data message matches the first matching information, and send the first encapsulation message via a first port, the first port is an egress port of the first forwarding device on the first path, and the first label includes a first protocol label corresponding to the protocol of the first request message and a first content label corresponding to the first identifier of the first content; generating, by the generating device, second forwarding information including second matching information and second operating information for the second forwarding device, wherein the second matching information includes the first label, the second operating information is used for instructing the second forwarding device to forward the first encapsulation message via a second port after receiving the first encapsulation message encapsulated with the first label, and the second port is an egress port of the second forwarding device on the first path; generating, by the generating device, third forwarding information including the second matching information and third operating information for the third forwarding device, wherein the third operating information is used for instructing the third forwarding device to obtain the first data message encapsulated in the first encapsulation message and carrying the first content by de-encapsulation after receiving the first encapsulation message encapsulated with the first label, and send the first data message to the first network element via a third port.

In combination with the first aspect, in a first possible implementation manner of the first aspect of the present application, the method further includes: receiving, by the generating device, a second request message used for requesting the first content for a third network element, wherein the second request message includes the first content identifier; determining, by the generating device, that the second network element is the provider of the first content according to the first registration information; determining, by the generating device, a second path from the second network element to the third network element according to the network topology, wherein the second path includes a fourth forwarding device, a fifth forwarding device and a sixth forwarding device, the fourth forwarding device is a forwarding device adjacent to the second network element on the second path, the sixth forwarding device is a forwarding device adjacent to the third network element on the second path, and the fifth forwarding device is a forwarding device located between the fourth forwarding device and the sixth forwarding device on the second path; generating, by the generating device, fourth forwarding information including fourth matching information and fourth operating information for the fourth forwarding device, wherein the fourth matching information includes an identifier of a protocol of the second request message and a second identifier of the first content, the fourth operating information is used for instructing the fourth forwarding device to encapsulate a second label for a second data message to obtain a second encapsulation message after determining that the received second data message matches the second matching information, and send the second encapsulation message via a fourth port, the fourth port is an egress port of the fourth forwarding device on the second path, the second label includes a second protocol label corresponding to the identifier of the protocol of the second request message and a second content label corresponding to the second identifier of the first content, the first identifier of the first content is different from the second identifier of the first content, and the first content label is different from the second content label; generating, by the generating device, fifth forwarding information including fifth matching information and fifth operating information for the fifth forwarding device, wherein the fifth matching information includes the second label, the fifth operating information is used for instructing the fifth forwarding device to forward the second encapsulation message via a fifth port after receiving the second encapsulation message encapsulated with the second label, and the fifth port is an egress port of the fifth forwarding device on the second path; generating, by the generating device, sixth forwarding information including the fifth matching information and sixth operating information for the sixth forwarding device, wherein the sixth operating information is used for instructing the sixth forwarding device to obtain the second data message encapsulated in the second encapsulation message and carrying the first content by de-encapsulation after receiving the second encapsulation message encapsulated with the second label, and send the second data message to the third network element via a sixth port.

In combination with the first possible implementation manner of the first aspect, in a second possible implementation manner of the first aspect of the present application, the first forwarding device and the fourth forwarding device are identical or different.

In combination with the first aspect or the first or second possible implementation manner of the first aspect, in a third possible implementation manner of the first aspect of the present application, the generating device is a server; the receiving, by a generating device, a first request message used for requesting a first content for a first network element, includes: receiving, by the generating device, the first request message from a controller; the method further includes: sending, by the generating device, the first forwarding information, the second forwarding information and the third forwarding information to the controller.

In combination with the first aspect or the first or second possible implementation manner of the first aspect, in a fourth possible implementation manner of the first aspect of the present application, the generating device is a controller; the receiving, by a generating device, a first request message used for requesting a first content for a first network element, includes: receiving, by the controller, the first request message from the third forwarding device; the method further includes: sending, by the generating device, the first forwarding information to the first forwarding device, sending the second forwarding information to the second forwarding device and sending the third forwarding information to the third forwarding device.

In combination with the first aspect, in a fifth possible implementation manner of the first aspect of the present application, the method further includes the following steps: receiving a content sending notification sent by the controller, and forwarding the content sending notification to an owner, wherein the content sending notification is used for notifying the owner to actively send the message.

To solve the above-mentioned technical problem, the second aspect of the present application provides a generating device, including a receiving module, a determining module, a path generating module and a flow table generating module, wherein the receiving module is configured to receive a first request message used for requesting a first content for a first network element, wherein the first request message includes a first content identifier, and the receiving module sends the first request message to the path generating module and the flow table generating module; the determining module is configured to determine that a second network element is a provider of the first content according to obtained first registration information, wherein the first registration information includes information indicating that the second network element is the provider of the first content, and the first registration information includes the first content identifier, and the determining module sends a determined result to the path generating module and the flow table generating module; the path generating module is configured to receive the first request message and the determined result, determine a first path from the second network element to the first network element according to network topology, wherein the first path includes a first forwarding device, a second forwarding device and a third forwarding device, the first forwarding device is a forwarding device adjacent to the second network element on the first path, the third forwarding device is a forwarding device adjacent to the first network element on the first path, and the second forwarding device is a forwarding device located between the first forwarding device and the third forwarding device on the first path, and the path generating module sends the first path to the flow table generating module; the flow table generating module is configured to receive the first request message, the determined result and the first path, and generate first forwarding information including first matching information and first operating information for the first forwarding device, wherein the first matching information includes an identifier of a protocol of the first request message and a first identifier of the first content, the first operating information is used for instructing the first forwarding device to encapsulate a first label for a first data message to obtain a first encapsulation message after determining that the received first data message matches the first matching information, and send the first encapsulation message via a first port, the first port is an egress port of the first forwarding device on the first path, and the first label includes a first protocol label corresponding to the protocol of the first request message and a first content label corresponding to the first identifier of the first content; generate second forwarding information including second matching information and second operating information for the second forwarding device, wherein the second matching information includes the first label, the second operating information is used for instructing the second forwarding device to forward the first encapsulation message via a second port after receiving the first encapsulation message encapsulated with the first label, and the second port is an egress port of the second forwarding device on the first path; generate third forwarding information including the second matching information and third operating information for the third forwarding device, wherein the third operating information is used for instructing the third forwarding device to obtain the first data message encapsulated in the first encapsulation message and carrying the first content by de-encapsulation after receiving the first encapsulation message encapsulated with the first label, and send the first data message to the first network element via a third port.

In combination with the second aspect, in a first possible implementation manner of the second aspect of the present application, the receiving module is further configured to receive a second request message used for requesting the first content for a third network element, wherein the second request message includes the first content identifier, and the receiving module sends the second request message to the path generating module and the flow table generating module; the determining module is further configured to determine that the second network element is the provider of the first content according to the first registration information, and the determining module sends a determined result to the path generating module and the flow table generating module; the path generating module is further configured to determine a second path from the second network element to the third network element according to network topology, wherein the second path includes a fourth forwarding device, a fifth forwarding device and a sixth forwarding device, the fourth forwarding device is a forwarding device adjacent to the second network element on the second path, the sixth forwarding device is a forwarding device adjacent to the third network element on the second path, the fifth forwarding device is a forwarding device located between the fourth forwarding device and the sixth forwarding device on the second path, and the path generating module sends the second path to the flow table generating module; the flow table generating module is configured to receive the second request message, the determined result and the second path, and generate fourth forwarding information including fourth matching information and fourth operating information for the fourth forwarding device, wherein the fourth matching information includes an identifier of a protocol of the second request message and a second identifier of the first content, the fourth operating information is used for instructing the fourth forwarding device to encapsulate a second label for a second data message to obtain a second encapsulation message after determining that the received second data message matches the second matching information, and send the second encapsulation message via a fourth port, the fourth port is an egress port of the fourth forwarding device on the second path, the second label includes a second protocol label corresponding to the identifier of the protocol of the second request message and a second content label corresponding to the second identifier of the first content, the first identifier of the first content is different from the second identifier of the first content, and the first content label is different from the second content label; generate fifth forwarding information including fifth matching information and fifth operating information for the fifth forwarding device, wherein the fifth matching information includes the second label, the fifth operating information is used for instructing the fifth forwarding device to forward the second encapsulation message via a fifth port after receiving the second encapsulation message encapsulated with the second label, and the fifth port is an egress port of the fifth forwarding device on the second path; generate sixth forwarding information including the fifth matching information and sixth operating information for the sixth forwarding device, wherein the sixth operating information is used for instructing the sixth forwarding device to obtain the second data message encapsulated in the second encapsulation message and carrying the first content by de-encapsulation after receiving the second encapsulation message encapsulated with the second label, and send the second data message to the third network element via a sixth port.

In combination with the first possible implementation manner of the second aspect, in a second possible implementation manner of the second aspect of the present application, the first forwarding device and the fourth forwarding device are identical or different.

In combination with the second aspect or the first or second possible implementation manner of the second aspect, in a third possible implementation manner of the second aspect of the present application, the generating device is a server; the receiving module is further configured to receive the first request message from a controller; the generating device further includes: a sending module, wherein the sending module is configured to send the first forwarding information, the second forwarding information and the third forwarding information to the controller.

In combination with the second aspect or the first or second possible implementation manner of the second aspect, in a fourth possible implementation manner of the second aspect of the present application, the generating device is a controller; the receiving module is further configured to receive the first request message from the third forwarding device; the generating device further includes: a sending module, wherein the sending module is configured to send the first forwarding information to the first forwarding device, send the second forwarding information to the second forwarding device and send the third forwarding information to the third forwarding device.

In the above-mentioned solutions, the first data message is encapsulated via the first label, such that data messages of different protocols use a same format, and thus messages of different protocol types may be simultaneously transmitted on the same network architecture.

DESCRIPTION OF EMBODIMENTS

In the following descriptions, for the purpose of illustration rather than limitation, specific details, such as a particular system structure, an interface, a technique, are proposed for thoroughly understanding of the present application. However, those skilled in the art should be aware that, the present application may also be implemented in other implementation manners without these specific details. In other conditions, detailed illustration to well-known apparatuses, circuits and methods are omitted to avoid the illustration of the present application is affected by unnecessary details.

Figure 1:
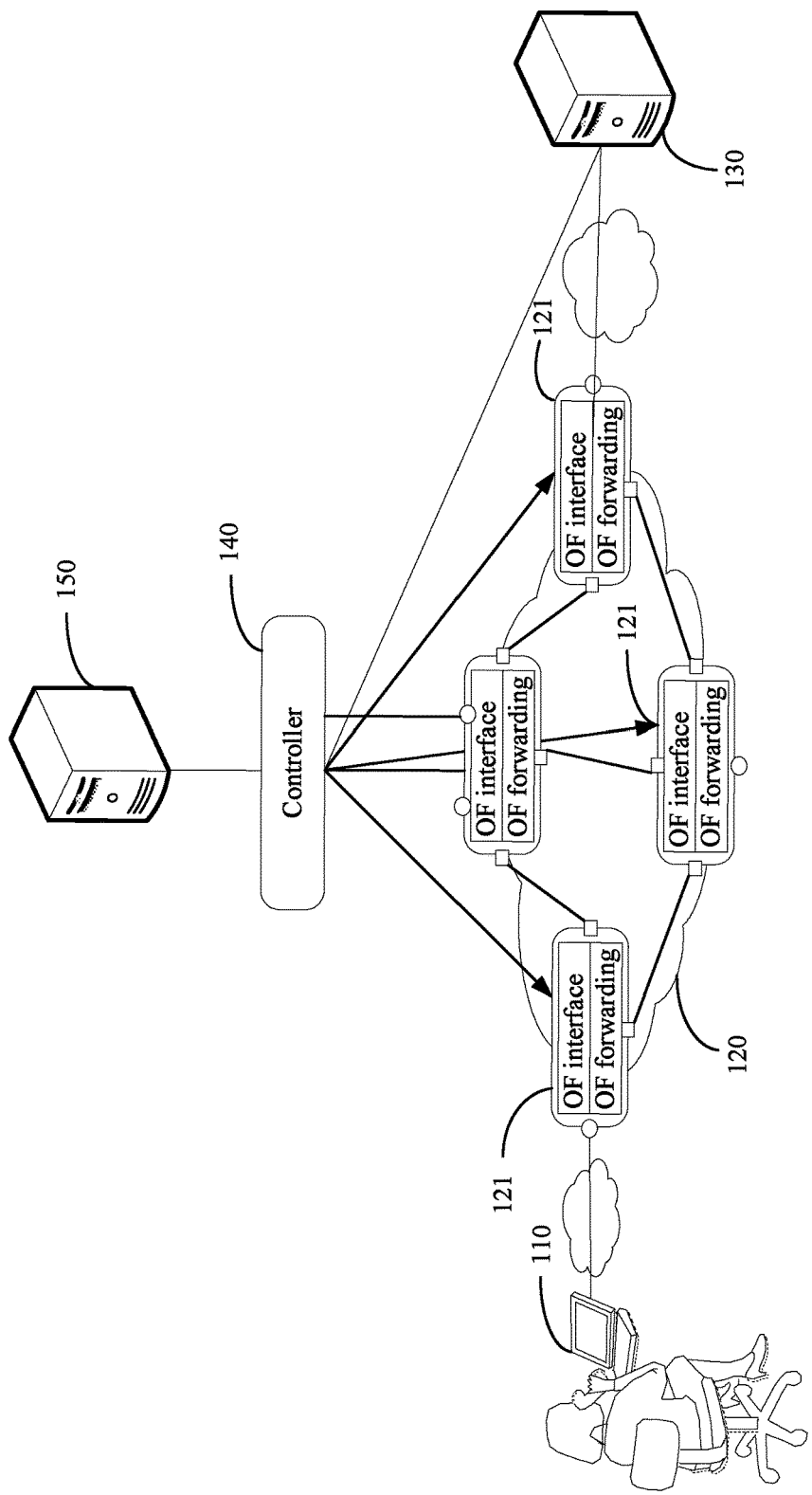
FIG. 1 is a schematic diagram of a structure of an implementation manner of a system for generating forwarding information in the present application.

FIG. 1 is a schematic diagram of a structure of an implementation manner of a system for generating forwarding information in the present application. The system for generating forwarding information in the implementation manner includes: a first network element 110, a forwarding network 120 composed of multiple forwarding devices 121 in topological connection, a second network element 130, a controller 140 and a server 150. The first network element 110 is at least coupled to one forwarding device 121 of the forwarding network 120, at least one forwarding device 121 of the forwarding network 120 is coupled to the second network element 130, and the controller 140 is respectively coupled to each forwarding device 121 of the forwarding network 120. The controller 140 is further coupled to the server 150. In another implementation manner, the controller 140 and the server 150 may also be integrated together.

Figure 2:
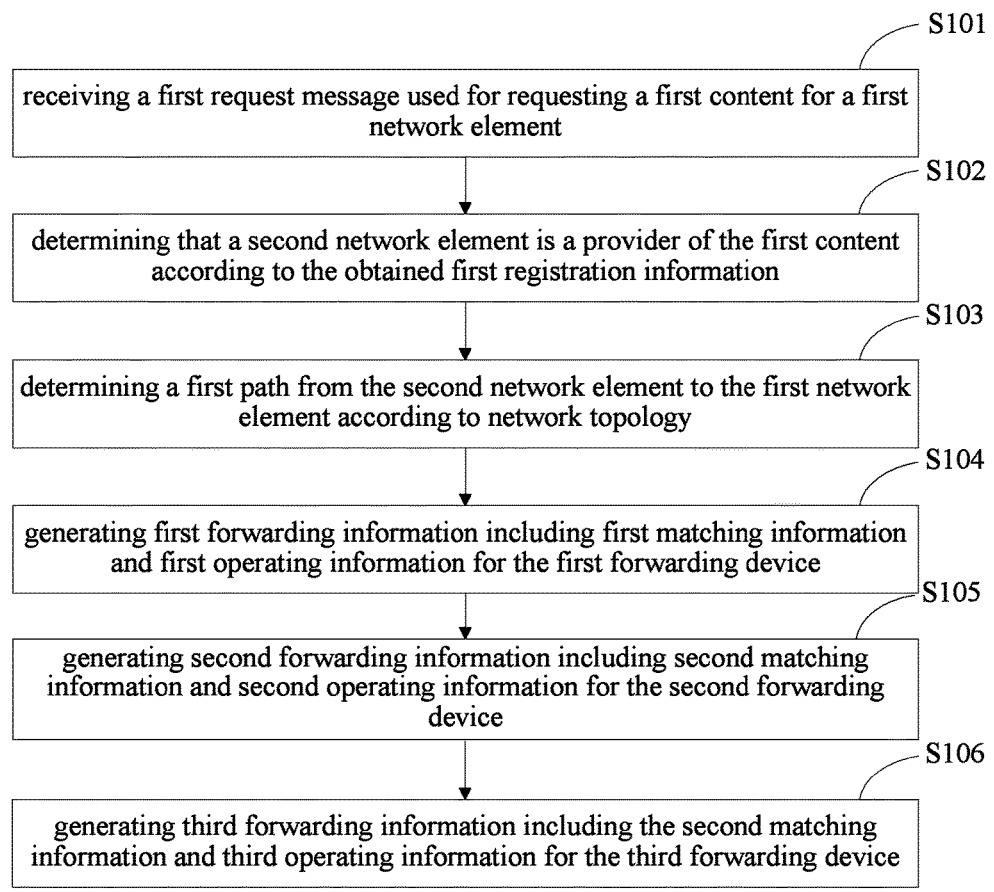
FIG. 2 is a flowchart of an implementation manner of a method for generating forwarding information in the present application.

FIG. 2 is a flowchart of an implementation manner of a method for generating forwarding information in the present application. The method for generating forwarding information in the implementation manner will be illustrated with a generating device as a main body, and the method includes the following steps.

S101: a generating device receives a first request message used for requesting a first content for a first network element.

The first network element may be a device intending to obtain the first content, wherein the first content may be resource such as a movie, a web page, music, etc. The first network element may belong to any protocol of information centric network, which includes protocols such as a PURSUIT protocol, an NDN protocol, and the like. Moreover, the first network element can only identify the message of this protocol.

When the first network element needs to acquire a data message including the first content, the first network element sends the first request message used for requesting the first content, wherein the first request message includes information indicating that the first network element is a requester of the first content and a first content identifier used for identifying the first content.

S102: the generating device determines that a second network element is a provider of the first content according to the obtained first registration information.

The second network element may be a device owning the first content. The second network element may also belong to any protocol of information centric network protocol, which includes protocols such as the PURSUIT protocol, the NDN protocol, and the like. Moreover, the second network element can only identify the message of this protocol.

When the second network element needs to issue a new content, the second network element sends a registration message. The registration message includes first registration information indicating that the second network element is the provider of the first content and the first content identifier used for identifying the first content.

The generating device may receive the first request message and the registration message at a same time or at different time. Moreover, the generating device receiving the first request message and the registration message at different time includes the cases that the generating device firstly receives the first request message, or that the generating device firstly receives the registration message.

Multiple control program modules are provided in the generating device, and each control program module only processes request messages and registration messages of one information centric network protocol. Thus, when receiving a request message and a registration message, the generating device will distinguish the request message and the registration message according to the information centric network protocol to which the request message and the registration message belong. Request messages and registration messages belonging to a same information centric network protocol will be sent to a same control program module, while request messages and registration messages belonging to different information centric network protocols will be sent to different control program modules, so as to isolate the request messages and the registration messages of different protocols on a physical layer.

After respectively receiving the first request message and the registration message, the generating device performs a matching according to a content identifier. If the first request message and the registration message have the same first content identifier, the matching is successful, and the generating device determines that the second network element is the provider of the first content according to the obtained first registration information. Moreover, it can be seen from the above-mentioned description that, request messages and registration messages of different protocols are isolated on the physical layer. Thus, when determining the second network element, only the network element belonging to a same information centric network protocol as the first network element is selected to serve as the second network element. Even if a certain network element has the first content either, the generating device will not select, if this network element and the first network element respectively belong to different information centric network protocols, this network element to serve as the provider of the first content.

S103: the generating device determines a first path from the second network element to the first network element according to network topology.

The network topology is used for characterizing connection relations among forwarding devices in a forwarding network. The generating device may obtain and locally store a network topology relation of the forwarding network in advance.

Figure 3:
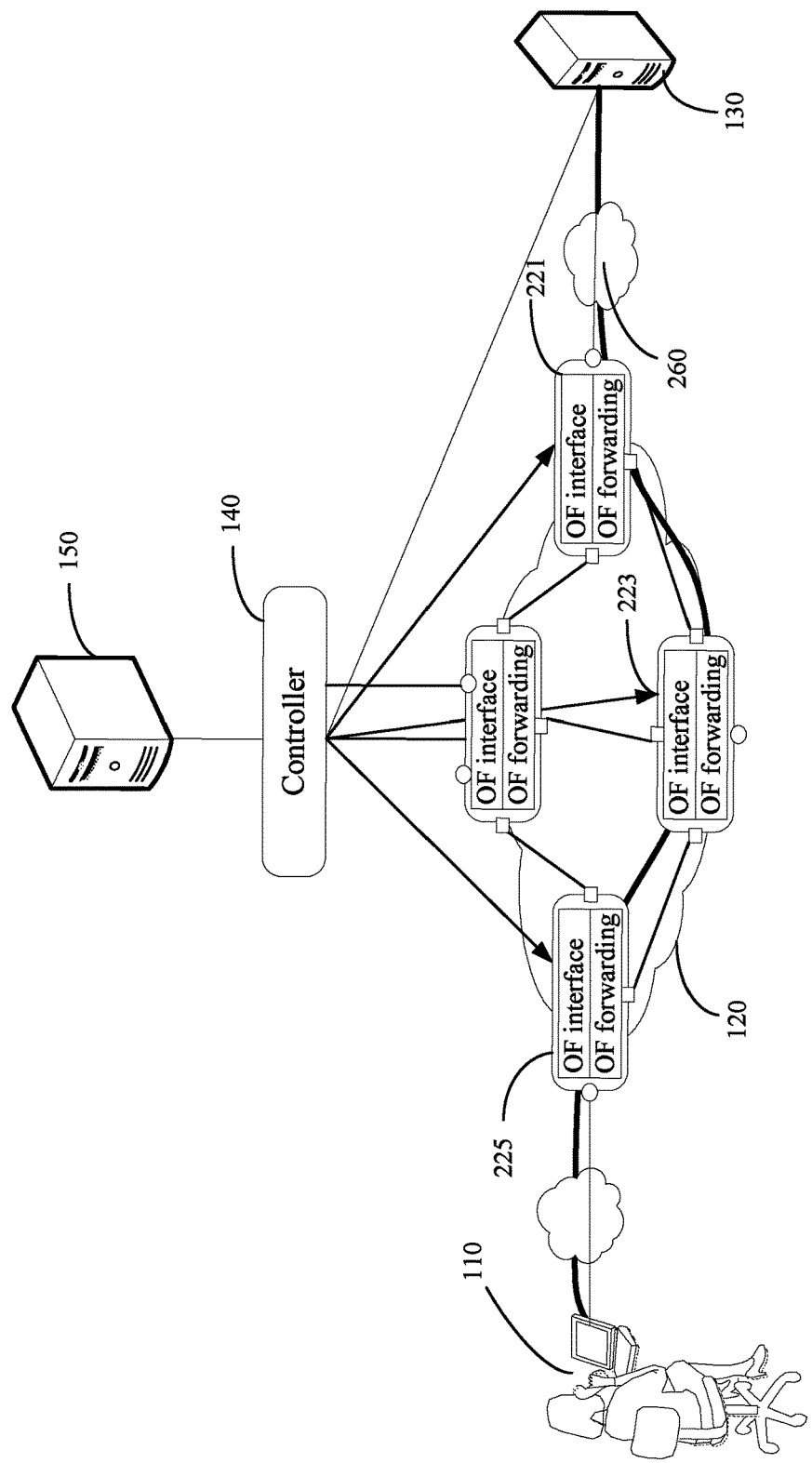
FIG. 3 is a schematic diagram of generating a first path in a method for generating forwarding information in the present application.

Please see FIG. 3 together. The generating device determines the first path 260 (as shown by a black thick line in the figure) from the second network element 130 to the first network element 110 according to the first network element 110, the second network element 130 and the network topology. Generally, the first path 260 is an optimal path. The first path 260 includes a first forwarding device 221, a second forwarding device 223 and a third forwarding device 225. The first forwarding device 221 is a forwarding device adjacent to the second network element 130 on the first path 260. The third forwarding device 225 is a forwarding device adjacent to the first network element 110 on the first path 260. The second forwarding device 223 is a forwarding device located between the first forwarding device 221 and the third forwarding device 225 on the first path 260.

S104: the generating device generates first forwarding information including first matching information and first operating information for the first forwarding device.

The first matching information includes an identifier of a protocol of the first request message and a first identifier of the first content. The identifier of the protocol of the first request message may be different according to different protocols. For example, in a PURSUIT protocol, the identifier of the protocol of the first request message is that the former 14 bytes of the data message represent an Ethernet header and the latter 32 bytes represent a routing label. In an NDN protocol, the identifier of the protocol of the first request message is that the former 32 bytes of the data message represent the first content identifier.

The first operating information is used for instructing the first forwarding device to encapsulate a first label for a first data message to obtain a first encapsulation message after determining that the received first data message matches the first matching information, and send the first encapsulation message via a first port. The first label includes a first protocol label corresponding to the identifier of the protocol of the first request message and a first content label corresponding to the first identifier of the first content, and the first port is an egress port of the second network element on the first path.

After receiving the first data message sent by the second network element, the first forwarding device identifies the first data message according to the identifier of the protocol of the first request message and the first identifier of the first content in the first matching information. The first data message is a message, which includes the first content, in a format of an information centric network protocol it originally belongs to. Since the first data message is not a data message using a uniform format (the uniform format herein refers to a format obtained by encapsulating a data message with a label), it can not be forwarded on a forwarding device compatible to different information centric network protocols. Thus, after receiving the first data message in a non-uniform format, the first forwarding device encapsulates the first data message with the first label according to the first operating information to obtain the first encapsulation message, and forwards the first encapsulation message to the next forwarding device.

A format of the encapsulated first encapsulation message is as follows:

| First protocol label | First content label | First data message |
| --- | --- | --- |

S105: the generating device generates second forwarding information including second matching information and second operating information for the second forwarding device.

The second matching information includes the first label and is used for identifying the first encapsulation message encapsulated with the first label.

The second operating information is used for instructing the second forwarding device to forward the first encapsulation message via a second port after receiving the first encapsulation message encapsulated with the first label, and the second port is an egress port of the second forwarding device on the first path.

After receiving the first encapsulation message encapsulated with the first label, the second forwarding device can identify the message in the uniform format according to the second matching information, and then forward the message on the first path according to the second operating information.

S106: the generating device generates third forwarding information including the second matching information and third operating information for the third forwarding device.

The second matching information in the third forwarding device is completely the same as the second matching information in the second forwarding device.

The third operating information is used for instructing the third forwarding device to obtain the first data message encapsulated in the first encapsulation message and carrying the first content by de-encapsulation after receiving the first encapsulation message encapsulated with the first label, and send the first data message to the first network element via a third port.

After receiving the first encapsulation message encapsulated with the first label, the third forwarding device may identify the message in the uniform format according to the second matching information, and then de-encapsulate the first encapsulation message according to the third operating information to make the first encapsulation message return to the first data message, which is capable of being identified by the first network element, and send it to the first network element serving as a requester.

There is no limitation on the sequence of step S104, step S105 and step S106, as long as before the second network element sends the first data message to the first network element, the generating device has completed the sending of the first forwarding information to the first forwarding device, the sending of the second forwarding information to the second forwarding device and the sending of the third forwarding information to the third forwarding device.

If a mode that the second network element pushes the first data message actively is adopted, the generating device needs to send a sending content notification to the second network element before the first data message is transmitted, for notifying the second network element to send the first data message to the first network element. If a mode that the first network element requests the first data message from the second network element is adopted, the generating device needs to return the first request message to the third forwarding device before the first data message is transmitted.

If the generating device is a server, the first request message is firstly sent to a controller through the third forwarding device. Then the generating device receives the first request message from the controller. Moreover, the generating device sends the first forwarding information, the second forwarding information and the third forwarding information to the controller, and the controller then respectively sends the first forwarding information, the second forwarding information and the third forwarding information to the first forwarding device, the second forwarding device and the third forwarding device. If the generating device is the controller, the first request message is sent to the controller through the third forwarding device. Moreover, the controller directly sends the first forwarding information, the second forwarding information and the third forwarding information to the first forwarding device, the second forwarding device and the third forwarding device respectively.

In the above-mentioned solutions, the first data message is encapsulated via the first label, such that data messages of different protocols use a same format, and thus messages of different protocol types may be simultaneously transmitted on the same network architecture.

Figure 4:
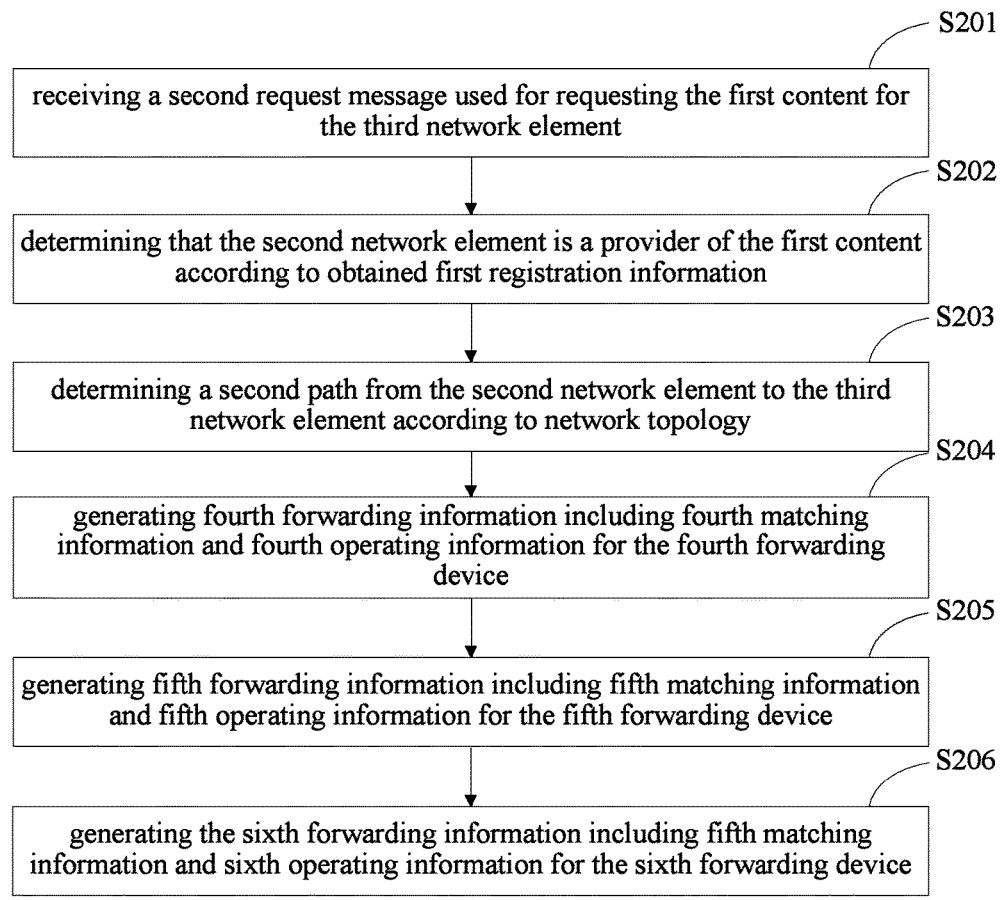
FIG. 4 is a flowchart of a third network element for requesting a first content from a second network element in a method for generating forwarding information in the present application.

If a third network element also requests the first content in the second network element when the first network element requests the first content in the second network element, then the third network element may request the first content in the second network element by a method as shown in FIG. 4. The method of this implementation manner is illustrated by taking a generating device as a main body, which includes the following steps.

S201: the generating device receives a second request message used for requesting the first content for the third network element.

Like the first network element, the third network element is a device intending to obtain the first content, wherein the first content may be resource such as a movie, a web page, music, etc. The third network element belongs to a same information centric network protocol as the first network element and the second network element, and the third network element can only identify a message of this protocol.

When the third network element needs to acquire a data message including the first content, the third network element sends the second request message used for requesting the first content, and the second request message includes information indicating that the third network element is the requester of the first content and a first content identifier used for identifying the first content.

S202: the generating device determines that the second network element is a provider of the first content according to obtained first registration information.

The generating device may receive the second request message and the registration message at the same time or at different time. Moreover, the generating device receiving the second request message and the registration message at different time includes cases that the generating device firstly receives the second request message, or the generating device firstly receives the registration message.

The second request message is sent to a control program module where the first request message is located. A matching of the second request message and the registration message is performed according to the first content identifier. If the second request message and the registration message have the same first content identifiers, the matching is successful, and the generating device determines that the second network element is the provider of the first content according to the obtained first registration information.

S203: the generating device determines a second path from the second network element to the third network element according to network topology.

The generating device determines the second path from the second network element to the third network element according to the second network element, the third network element and the network topology. Generally, the second path is an optimal path. The second path includes a fourth forwarding device, a fifth forwarding device and a sixth forwarding device. The fourth forwarding device is a forwarding device adjacent to the second network element on the second path. The sixth forwarding device is a forwarding device adjacent to the third network element on the second path. The fifth forwarding device is a forwarding device located between the fourth forwarding device and the sixth forwarding device on the second path.

S204: the generating device generates fourth forwarding information including fourth matching information and fourth operating information for the fourth forwarding device.

The fourth matching information includes an identifier of a protocol of the second request message and a second identifier of the first content. The identifier of the protocol of the second request message is different according to different protocols. For example, in the PURSUIT protocol, the identifier of the protocol of the second request message is that the former 14 bytes of the data message represent the Ethernet header and the latter 32 bytes represent the routing label. In the NDN protocol, the identifier of the protocol of the second request message is that the former 32 bytes of the data message represent the first content identifier. The second identifier of the first content may be obtained on the basis of the first identifier of the first content, for example, the second identifier of the first content is obtained by adding an offset on the first identifier of the first content.

The fourth operating information is used for instructing the fourth forwarding device to encapsulate a second data message with a second label to obtain a second encapsulation message after determining that the received second data message matches the second matching information, and send the second encapsulation message via a fourth port. The fourth port is an egress port of the fourth forwarding device on the second path. The second label includes a second protocol label corresponding to the identifier of the protocol of the second request message and a second content label corresponding to the second identifier of the first content. The first identifier of the first content is different from the second identifier of the first content, and the first content label is different from the second content label.

After receiving the second data message sent by the second network element, the fourth forwarding device identifies the second data message according to the identifier of the protocol of the second request message and the second identifier of the first content in the fourth matching information. The second data message is a message, which includes the first content, in a format of an information centric network protocol it originally belongs to. Although the identifier of the protocol of the second request message in the fourth matching information is completely the same as the identifier of the protocol of the first request message in the first matching information, the second identifier of the first content in the fourth matching information is different from the first identifier of the first content in the first matching information. Thus, the fourth forwarding device will not confuse the second data message including the first content, which is sent to the third network element, with the first data message including the first content, which is sent to the first network element.

Since the second data message is not a data message using a uniform format (the uniform format herein refers to a format obtained by encapsulating a data message with a label), it can not be forwarded on a forwarding device compatible to different information centric network protocols. Thus, after receiving the second data message in a non-uniform format, the fourth forwarding device encapsulates the second data message with the second label according to the fourth operating information to obtain the second encapsulation message, and forwards the second encapsulation message to the next forwarding device.

A format of the encapsulated second encapsulation message is as follows:

| First protocol label | Second content label | Second data message |
|---|---|---|

S205: the generating device generates fifth forwarding information including fifth matching information and fifth operating information for the fifth forwarding device.

The fifth matching information includes the second label and is used for identifying the second encapsulation message encapsulated with the second label.

The fifth operating information is used for instructing the fifth forwarding device to forward the second encapsulation message via a fifth port after receiving the second encapsulation message encapsulated with the second label, and the fifth port is an egress port of the fifth forwarding device on the second path.

After receiving the second encapsulation message encapsulated with the second label, the second forwarding device can identify the message in the uniform format according to the fifth matching information, and then forward the message on the second path according to the fifth operating information.

S206: the generating device generates sixth forwarding information including the fifth matching information and sixth operating information for the sixth forwarding device.

The fifth matching information in the sixth forwarding device is completely the same as the fifth matching information in the fifth forwarding device.

The sixth operating information is used for instructing the sixth forwarding device to obtain a second data message encapsulated in the second encapsulation message and carrying the first content by de-encapsulation after receiving the second encapsulation message encapsulated with the second label, and send the second data message to the third network element through the sixth port.

After receiving the second encapsulation message encapsulated with the second label, the fifth forwarding device can identify the message in the uniform format according to the fifth matching information, and then de-encapsulate the second encapsulation message according to the sixth operating information to return the second encapsulation message to the second data message, which is capable of being identified by the third network element, and send it to the third network element serving as a requester.

There is no limitation on the sequence of step S204, step S205 and step S206, as long as before the second network element sends the second data message to the third network element, the generating device has completed the sending of the fourth forwarding information to the fourth forwarding device, the sending of the fifth forwarding information to the fifth forwarding device and the sending of the sixth forwarding information to the sixth forwarding device.

The first forwarding device and the fourth forwarding device may be a same forwarding device or different forwarding devices, which are specifically determined by the generated path.

The above-mentioned solution, through respectively generating the first identifier of the first content and the second identifier of the first content for the first data message sent to the first network element and the second data message sent to the third network element, which are different identifiers, the first data message and the second data message thus are distinguished.

Figure 5:
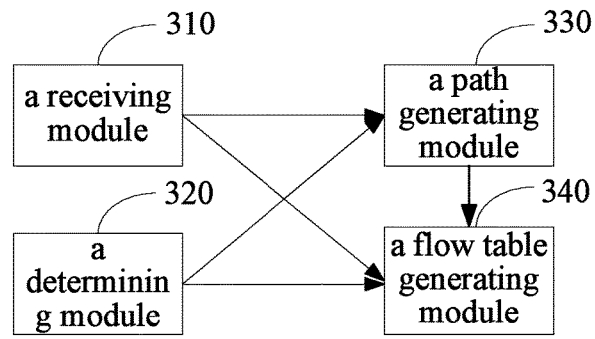
FIG. 5 is a schematic diagram of a structure of an implementation manner of a generating device in the present application.

FIG. 5 is a schematic diagram of a structure of an implementation manner of a generating device in the present application. The generating device in the implementation manner includes a receiving module 310, a determining module 320, a path generating module 330 and a flow table generating module 340.

The receiving module 310 is configured to receive a first request message used for requesting a first content for a first network element. The first request message includes a first content identifier, and the first network element may be a device intending to obtain the first content, wherein the first content may be resource such as a movie, a web page, music, etc. The first network element may belong to any protocol of information centric network, which includes protocols such as a PURSUIT protocol, an NDN protocol, and the like. Moreover, the first network element can only identify the message of this protocol. For example, when the first network element needs to acquire a data message including the first content, the first network element sends the first request message used for requesting the first content, and the receiving module 310 correspondingly receives the first request message used for requesting the first content for the first network element. The first request message includes information indicating that the first network element is a requester of the first content and a first content identifier used for identifying the first content.

The receiving module 310 sends the first request message to the path generating module 330 and the flow table generating module 340.

The determining module 320 is configured to determine that a second network element is a provider of the first content according to obtained first registration information, wherein the first registration information includes information indicating that the second network element is the provider of the first content, and the first registration information includes the first content identifier. The second network element may be a device owning the first content. The second network element may also belong to any protocol of information centric network, which includes protocols such as the PURSUIT protocol, the NDN protocol, and the like. Moreover, the second network element can only identify the message of this protocol.

For example, when the second network element needs to issue a new content, the second network element sends a registration message. The registration message includes first registration information indicating that the second network element is the provider of the first content and the first content identifier used for identifying the first content.

The generating device may receive the first request message and the registration message at a same time or at different time. Moreover, the generating device receiving the first request message and the registration message at different time includes the cases that the generating device firstly receives the first request message, or that the generating device firstly receives the registration message.

Multiple control program modules are provided in the generating device, and each control program module only processes request messages and registration messages of one information centric network protocol. Thus, when receiving a request message and a registration message, the generating device will distinguish the request message and the registration message according to the information centric network protocol to which the request message and the registration message belong. Request messages and registration messages belonging to a same information centric network protocol will be sent to a same control program module, while request messages and registration messages belonging to different information centric network protocols will be sent to different control program modules, so as to isolate the request messages and the registration messages of different protocols on a physical layer.

After respectively receiving the first request message and the registration message, the generating device performs a matching according to the content identifier. If the first request message and the registration message have the same first content identifier, the matching is successful, and the generating device determines that the second network element is the provider of the first content according to the obtained first registration information. Moreover, it can be seen from the above-mentioned description that, request messages and registration messages of different protocols are isolated on the physical layer. Thus, when determining the second network element, the determining module 320 only selects the network element belonging to a same information centric network protocol as the first network element to serve as the second network element. Even if a certain network element has the first content either, the determining module 320 will not select, if the network element and the first network element respectively belong to different information centric network protocols, this network element to serve as the provider of the first content.

The determining module 320 sends a determined result to the path generating module 330 and the flow table generating module 340.

The path generating module 330 is configured to receive the first request message and the determined result, determine a first path from the second network element to the first network element according to network topology, wherein the first path includes a first forwarding device, a second forwarding device and a third forwarding device, the first forwarding device is a forwarding device adjacent to the second network element on the first path, the third forwarding device is a forwarding device adjacent to the first network element on the first path, and the second forwarding device is a forwarding device located between the first forwarding device and the third forwarding device on the first path.

For example, the network topology is used for characterizing connection relations among forwarding devices in a forwarding network. The generating device may obtain and locally store the network topology relation of the forwarding network in advance.

Please see FIG. 3 together. The path generating module 330 determines the first path 260 (as shown by a black thick line in the figure) from the second network element 130 to the first network element 110 according to the first network element 110, the second network element 130 and the network topology. Generally, the first path 260 is an optimal path. The first path 260 includes a first forwarding device 221, a second forwarding device 223 and a third forwarding device 225. The first forwarding device 221 is a forwarding device adjacent to the second network element 130 on the first path 260. The third forwarding device 225 is a forwarding device adjacent to the first network element 110 on the first path 260. The second forwarding device 223 is a forwarding device located between the first forwarding device 221 and the third forwarding device 225 on the first path 260.

The path generating module 330 sends the first path to the flow table generating module 340.

The flow table generating module 340 is configured to receive the first request message, the determined result and the first path, and generate first forwarding information including first matching information and first operating information for the first forwarding device, wherein the first matching information includes an identifier of a protocol of the first request message and a first identifier of the first content, the first operating information is used for instructing the first forwarding device to encapsulate a first data message with a first label to obtain a first encapsulation message after determining that the received first data message matches the first matching information, and send the first encapsulation message via a first port, the first port is an egress port of the second network element on the first path, and the first label includes a first protocol label corresponding to the protocol of the first request message and a first content label corresponding to the first identifier of the first content; generate second forwarding information including second matching information and second operating information for the second forwarding device, wherein the second matching information includes the first label, the second operating information is used for instructing the second forwarding device to forward the first encapsulation message via a second port after receiving the first encapsulation message encapsulated with the first label, and the second port is an egress port of the second forwarding device on the first path; generate third forwarding information including the second matching information and third operating information for the third forwarding device, wherein the third operating information is used for instructing the third forwarding device to obtain the first data message encapsulated in the first encapsulation message and carrying the first content by de-encapsulation after receiving the first encapsulation message encapsulated with the first label, and send the first data message to the first network element via a third port.

If the generating device is a server, the first request message is firstly sent to a controller through the third forwarding device. Then the receiving module 310 receives the first request message from the controller. Moreover, the first forwarding information, the second forwarding information and the third forwarding information are sent to the controller through a sending module, and the controller then respectively sends the first forwarding information, the second forwarding information and the third forwarding information to the first forwarding device, the second forwarding device and the third forwarding device. If the generating device is the controller, the first request message is sent to the receiving module 310 through the third forwarding device. Moreover, the sending module directly sends the first forwarding information, the second forwarding information and the third forwarding information to the first forwarding device, the second forwarding device and the third forwarding device respectively.

In the above-mentioned solutions, the first data message is encapsulated via the first label, such that the data messages of different protocols use a same format, and thus messages of different protocol types may be simultaneously transmitted on the same network architecture.

If a third network element also requests the first content in the second network element when the first network element requests the first content in the second network element, then, the receiving module 310 is further configured to receive a second request message used for requesting the first content for a third network element, wherein the second request message includes the first content identifier. Like the first network element, the third network element is a device hoping to obtain the first content, wherein the first content may be such resources as movies, web pages, music, etc. The third network element belongs to the same information-centric network protocol as the first network element and the second network element, and the third network element may only identify the message of this protocol.

For example, when the third network element needs to acquire a data message including the first content, the third network element sends the second request message used for requesting the first content, wherein the second request message includes information indicating that the third network element is the requester of the first content and a first content identifier used for identifying the first content. The receiving module 310 correspondingly receives the second request message used for requesting the first content for the third network element.

The receiving module 310 sends the second request message to the path generating module 330 and the flow table generating module 340.

The determining module 320 is further configured to determine that the second network element is the provider of the first content according to the first registration information.

For example, the generating device may receive the first request message and the registration message at a same time or at different time. Moreover, the generating device receiving the second request message and the registration message at different time includes cases that the generating device firstly receives the second request message, or that the generating device firstly receives the registration message.

The second request message is sent to a control program module where the first request message is located. A matching of the second request message and the registration message is performed according to the first content identifier. If the second request message and the registration message have the same first content identifier, the matching is successful, and the determining module 320 determines that the second network element is the provider of the first content according to the obtained first registration information.

The determining module 320 sends a determined result to the path generating module 330 and the flow table generating module 340.

The path generating module 330 is further configured to determine a second path from the second network element to the third network element according to network topology, wherein the second path includes a fourth forwarding device, a fifth forwarding device and a sixth forwarding device, the fourth forwarding device is a forwarding device adjacent to the second network element on the second path, the sixth forwarding device is a forwarding device adjacent to the third network element on the second path, and the fifth forwarding device is a forwarding device located between the fourth forwarding device and the sixth forwarding device on the second path.

The path generating module 330 sends the second path to the flow table generating module 340.

The flow table generating module 340 is configured to receive the second request message, the determined result and the second path, and generate fourth forwarding information including fourth matching information and fourth operating information for the fourth forwarding device, generate fifth forwarding information including fifth matching information and fifth operating information for the fifth forwarding device, and generate sixth forwarding information including fifth matching information and sixth operating information for the sixth forwarding device.

The fourth matching information includes an identifier of a protocol of the second request message and a second identifier of the first content, the fourth operating information is used for instructing the fourth forwarding device to encapsulate a second data message with a second label to obtain a second encapsulation message after determining that the received second data message matches the second matching information, and send the second encapsulation message via a fourth port, the fourth port is an egress port of the fourth forwarding device on the second path, the second label includes a second protocol label corresponding to the identifier of the protocol of the second request message and a second content label corresponding to the second identifier of the first content, the first identifier of the first content is different from the second identifier of the first content, and the first content label is different from the second content label. The second identifier of the first content may be obtained on the basis of the first identifier of the first content, for example, the second identifier of the first content is obtained by adding an offset on the first identifier of the first content.

The fifth matching information includes the second label, the fifth operating information is used for instructing the fifth forwarding device to forward the second encapsulation message via a fifth port after receiving the second encapsulation message encapsulated with the second label, and the fifth port is an egress port of the fifth forwarding device on the second path.

The sixth operating information is used for instructing the sixth forwarding device to obtain a second data message encapsulated in the second encapsulation message and carrying the first content by de-encapsulation after receiving the second encapsulation message encapsulated with the second label, and send the second data message to the third network element through the sixth port.

The first forwarding device and the fourth forwarding device may be the same or different.

In the above-mentioned solution, by respectively generating the first identifier of the first content and the second identifier of the first content for the first data message sent to the first network element and the second data message sent to the third network element, which are different identifiers, the first data message and the second data message are distinguished.

Figure 6:
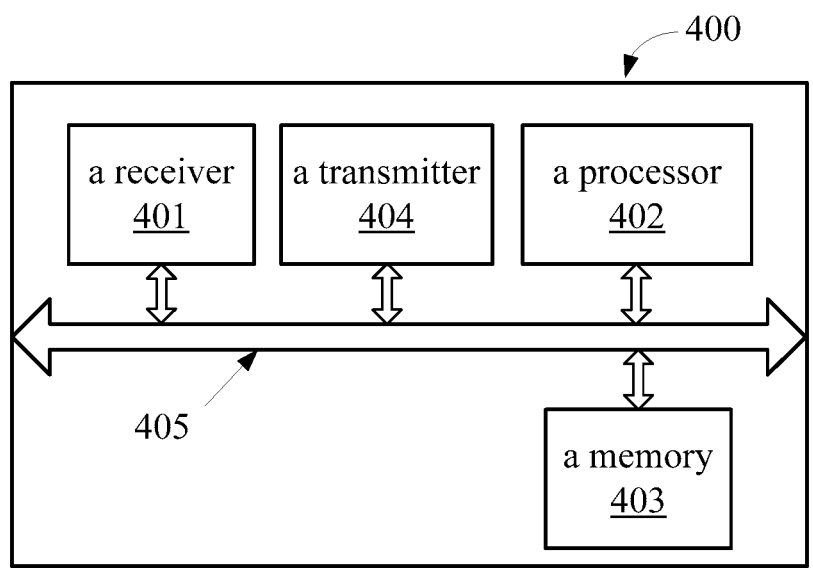
FIG. 6 is a schematic diagram of a structure of another implementation manner of a generating device in the present application.

FIG. 6 is a schematic diagram of a structure of another implementation manner of a generating device in the present application. The generating device 400 in the present application includes a receiver 401, a processor 402, a memory 403, a transmitter 404 and a bus 405.

The receiver 401 may be wired or wireless. The receiver 401 includes any component, device, apparatus or system capable of receiving data, such as a network adapter, a wireless network receiver, a bluetooth receiver, etc.

The processor 402 controls the operation of the generating device 400. The processor 402 may also be referred as a CPU (central processing unit). The processor 402 may be an integrated circuit chip with signal processing capacity. The processor 402 may also be a general-purpose processor, a digital signal processor (DSP), an application-specific integrated circuit (ASIC), a field-programmable gate array (FPGA) or other programmable logic devices, a discrete gate or a transistor logic device and a discrete hardware component. The general-purpose processor may be a microprocessor or the processor may be any conventional processor, etc.

The memory 403 may include a read only memory and a random access memory and provides instructions and data to the processor 402. A part of the memory 403 may further include a non-volatile random access memory (NVRAM).

The transmitter 404 may also be wired or wireless. The transmitter 404 includes any component, device, apparatuses or system capable of sending data, such as a network adapter, a wireless network transmitter, a bluetooth transmitter, etc.

All components of the generating device 400 are coupled together through a bus system 405, wherein besides a data bus, the bus system 405 may further include a power bus, a control bus, a state signal bus, etc. However, for the sake of clearness, various buses are marked as the bus system 405 in the figures.

The memory 403 stores the following elements, executable modules data structures, their subsets or their extensions:

operating instructions: including various operating instructions for achieving various operations.

an operating system: including various system programs for achieving various basic services and processing a task based on hardware.

In the embodiment of the present disclosure, the processor 402 dispatches the operating instruction (the operating instruction may be stored in the operating system) stored in the memory 403 to execute the following operations.

The receiver 401 receives a first request message used for requesting a first content for a first network element, wherein the first request message includes a first content identifier.

The processor 402 determines that a second network element is a provider of the first content according to obtained first registration information, wherein the first registration information includes information indicating that the second network element is the provider of the first content, and the first registration information includes the first content identifier.

The processor 402 determines a first path from the second network element to the first network element according to network topology, wherein the first path includes a first forwarding device, a second forwarding device and a third forwarding device, the first forwarding device is a forwarding device adjacent to the second network element on the first path, the third forwarding device is a forwarding device adjacent to the first network element on the first path, and the second forwarding device is a forwarding device located between the first forwarding device and the third forwarding device on the first path.

The processor 402 generates first forwarding information including first matching information and first operating information for the first forwarding device, wherein the first matching information includes an identifier of a protocol of the first request message and a first identifier of the first content, the first operating information is used for instructing the first forwarding device to encapsulate a first label for a first data message to obtain a first encapsulation message after determining that the received first data message matches the first matching information, and send the first encapsulation message via a first port, the first port is an egress port of the second network element on the first path, and the first label includes a first protocol label corresponding to the protocol of the first request message and a first content label corresponding to the first identifier of the first content.

The processor 402 generates second forwarding information including second matching information and second operating information for the second forwarding device, wherein the second matching information includes the first label, the second operating information is used for instructing the second forwarding device to forward the first encapsulation message via a second port after receiving the first encapsulation message encapsulated with the first label, and the second port is an egress port of the second forwarding device on the first path.

The processor 402 generates third forwarding information including the second matching information and third operating information for the third forwarding device, wherein the third operating information is used for instructing the third forwarding device to obtain the first data message encapsulated in the first encapsulation message and carrying the first content by de-encapsulation after receiving the first encapsulation message encapsulated with the first label, and send the first data message to the first network element via a third port.

If the generating device is a server, the first request message is firstly sent to a controller through the third forwarding device, and then the receiver 401 receives the first request message from the controller. Moreover, the transmitter 402 sends the first forwarding information, the second forwarding information and the third forwarding information to the controller, and the controller respectively sends the first forwarding information, the second forwarding information and the third forwarding information to the first forwarding device, the second forwarding device and the third forwarding device. If the generating device is the controller, the first request message is sent to the receiver 401 through the third forwarding device. Moreover, the transmitter 402 directly sends the first forwarding information, the second forwarding information and the third forwarding information to the first forwarding device, the second forwarding device and the third forwarding device respectively.

In the above-mentioned solutions, the first data message is encapsulated via the first label, such that the data messages of different protocols use a same format, and thus messages of different protocol types may be simultaneously transmitted on the same network architecture.

If a third network element also requests the first content in the second network element when the first network element requests the first content in the second network element, then, the receiver 401 is configured to receive a second request message used for requesting the first content for a third network element, wherein the second request message includes the first content identifier.

The processor 402 determines that the second network element is the provider of the first content according to the first registration information.

The processor 402 determines a second path from the second network element to the third network element according to network topology, wherein the second path includes a fourth forwarding device, a fifth forwarding device and a sixth forwarding device, the fourth forwarding device is a forwarding device adjacent to the second network element on the second path, the sixth forwarding device is a forwarding device adjacent to the third network element on the second path, and the fifth forwarding device is a forwarding device located between the fourth forwarding device and the sixth forwarding device on the second path.

The processor 402 generates fourth forwarding information including fourth matching information and fourth operating information for the fourth forwarding device, the fourth matching information includes an identifier of a protocol of the second request message and a second identifier of the first content, the fourth operating information is used for instructing the fourth forwarding device to encapsulate a second label for a second data message to obtain a second encapsulation message after determining that the received second data message matches the second matching information, and send the second encapsulation message via a fourth port, the fourth port is an egress port of the fourth forwarding device on the second path, the second label includes a second protocol label corresponding to the identifier of the protocol of the second request message and a second content label corresponding to the second identifier of the first content, the first identifier of the first content is different from the second identifier of the first content, and the first content label is different from the second content label. The second identifier of the first content may be obtained on the basis of the first identifier of the first content, for example, the second identifier of the first content is obtained by adding an offset on the first identifier of the first content.

The processor 402 generates fifth forwarding information including fifth matching information and fifth operating information for the fifth forwarding device, wherein the fifth matching information includes the second label, the fifth operating information is used for instructing the fifth forwarding device to forward the second encapsulation message via a fifth port after receiving the second encapsulation message encapsulated with the second label, and the fifth port is an egress port of the fifth forwarding device on the second path.

The processor 402 generates sixth forwarding information including the fifth matching information and sixth operating information for the sixth forwarding device, wherein the sixth operating information is used for instructing the sixth forwarding device to obtain the second data message encapsulated in the second encapsulation message and carrying the first content by de-encapsulation after receiving the second encapsulation message encapsulated with the second label, and send the second data message to the third network element via a sixth port. The first forwarding device and the fourth forwarding device may be the same or different.

During operation, the generating device in the implementation manner may execute all the steps of the method for generating forwarding information in the present application. For the convenience of description, please see related illustrations from FIG. 2 to FIG. 4, which will not described in detail herein.

In the above-mentioned solution, by respectively generating the first identifier of the first content and the second identifier of the first content for the first data message sent to the first network element and the second data message sent to the third network element, which are different identifiers, the first data message and the second data message are distinguished.

In the several embodiments provided in the present application, it should be understood that, the disclosed system, apparatus and method may be implemented in other manners. For example, the apparatus embodiments described above are merely exemplary, e.g., the division of the modules or units is only a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection of devices or units through some interfaces, and may be in electrical, mechanical or other forms.

The units described as separate components may be separated physically or not, components displayed as units may be physical units or not, namely, may be located in one place, or may be distributed on a plurality of network units. A part or all of the units may be selected to achieve the purposes of the technical solutions in the embodiments according to actual demand.

In addition, the functional units in the embodiments of the present application may be integrated in a processing unit, or the units singly exist physically, or two or more units are integrated in one unit. The above-mentioned integrated unit may be both achieved in the form of hardware and may also be achieved in the form of a software function unit.

If the integrated unit is implemented in the form of the software functional unit and is sold or used as an independent product, it may be stored in a computer readable storage medium. Based on this understanding, the technical solutions of the present application substantially, or the part contributing to the prior art, or a part of the technical solutions may be implemented in the form of a software product, the computer software product is stored in a storage medium, and includes a plurality of instructions enabling a computer device (may be a personnel computer, a server, or a network device, etc.) or a processor (processor) to execute all or a part of the steps of the methods in the embodiments of the present disclosure. The foregoing storage medium includes a variety of media capable of storing program codes, such as a USB disk, a mobile hard disk, a read-only memory (ROM), a random access memory (RAM), a magnetic disk, an optical disk or the like.

What is claimed is:

1. A method for generating forwarding information, comprising:

receiving, by a generating device from a controller, a first request message used for requesting a first content for a first network element, wherein the first request message comprises a first content identifier, wherein the generating device is a server;

determining, by the generating device, that a second network element is a provider of the first content according to first registration information, wherein the first registration information comprises information indicating that the second network element is the provider of the first content, and the first registration information comprises the first content identifier;

determining, by the generating device, a first path from the second network element to the first network element according to a network topology, wherein the first path comprises a first forwarding device, a second forwarding device, and a third forwarding device, wherein the first forwarding device is a forwarding device adjacent to the second network element on the first path, the third forwarding device is a forwarding device adjacent to the first network element on the first path, and the second forwarding device is a forwarding device located between the first forwarding device and the third forwarding device on the first path;

generating, by the generating device, first forwarding information comprising first matching information and first operating information for the first forwarding device, wherein the first matching information comprises an identifier of a protocol of the first request message and a first identifier of the first content, the first operating information comprises operating instructions that instruct the first forwarding device to encapsulate a first label for a first data message to obtain a first encapsulation message after determining that the first data message matches the first matching information, and send the first encapsulation message via a first port, wherein the first port is an egress port of the first forwarding device on the first path, and the first label comprises a first protocol label corresponding to the protocol of the first request message and a first content label corresponding to the first identifier of the first content;

generating, by the generating device, second forwarding information comprising second matching information and second operating information for the second forwarding device, wherein the second matching information comprises the first label, the second operating information comprises operating instructions that instruct the second forwarding device to forward the first encapsulation message via a second port after receiving the first encapsulation message encapsulated with the first label, and the second port is an egress port of the second forwarding device on the first path;

generating, by the generating device, third forwarding information comprising the second matching information and third operating information for the third forwarding device, wherein the third operating information comprises operating instructions that instruct the third forwarding device to obtain, by de-encapsulation, the first data message encapsulated in the first encapsulation message and carrying the first content after receiving the first encapsulation message encapsulated with the first label, and send the first data message to the first network element via a third port; and sending, by the generating device, the first forwarding information, the second forwarding information, and the third forwarding information to the controller.

2. The method of claim 1, further comprising:

receiving, by the generating device, a second request message used for requesting the first content for a third network element, wherein the second request message comprises the first content identifier;

determining, by the generating device, that the second network element is the provider of the first content according to the first registration information;

determining, by the generating device, a second path from the second network element to the third network element according to the network topology, wherein the second path comprises a fourth forwarding device, a fifth forwarding device, and a sixth forwarding device, wherein the fourth forwarding device is a forwarding device adjacent to the second network element on the second path, the sixth forwarding device is a forwarding device adjacent to the third network element on the second path, and the fifth forwarding device is a forwarding device located between the fourth forwarding device and the sixth forwarding device on the second path;

generating, by the generating device, fourth forwarding information comprising fourth matching information and fourth operating information for the fourth forwarding device, wherein the fourth matching information comprises an identifier of a protocol of the second request message and a second identifier of the first content, the fourth operating information comprises operating instructions that instruct the fourth forwarding device to encapsulate a second label for a second data message to obtain a second encapsulation message after determining that the second data message matches the second matching information, and send the second encapsulation message via a fourth port, wherein the fourth port is an egress port of the fourth forwarding device on the second path, the second label comprises a second protocol label corresponding to the identifier of the protocol of the second request message and a second content label corresponding to the second identifier of the first content, the first identifier of the first content is different from the second identifier of the first content, and the first content label is different from the second content label;

generating, by the generating device, fifth forwarding information comprising fifth matching information and fifth operating information for the fifth forwarding device, wherein the fifth matching information comprises the second label, the fifth operating information comprises operating instructions that instruct the fifth forwarding device to forward the second encapsulation message via a fifth port after receiving the second encapsulation message encapsulated with the second label, and the fifth port is an egress port of the fifth forwarding device on the second path; and generating, by the generating device, sixth forwarding information comprising the fifth matching information and sixth operating information for the sixth forwarding device, wherein the sixth operating information comprises operating instructions that instruct the sixth forwarding device to obtain, by de-encapsulation, the second data message encapsulated in the second encapsulation message and carrying the first content after receiving the second encapsulation message encapsulated with the second label, and send the second data message to the third network element via a sixth port.

3. The method of claim 2, wherein the first forwarding device and the fourth forwarding device are identical or are different.

4. A method for generating forwarding information, comprising:

receiving, by a generating device from a third forwarding device, a first request message used for requesting a first content for a first network element, wherein the first request message comprises a first content identifier, wherein the generating device is a controller;

determining, by the generating device, that a second network element is a provider of the first content according to first registration information, wherein the first registration information comprises information indicating that the second network element is the provider of the first content, and the first registration information comprises the first content identifier;

determining, by the generating device, a first path from the second network element to the first network element according to a network topology, wherein the first path comprises a first forwarding device, a second forwarding device, and the third forwarding device, wherein the first forwarding device is a forwarding device adjacent to the second network element on the first path, the third forwarding device is a forwarding device adjacent to the first network element on the first path, and the second forwarding device is a forwarding device located between the first forwarding device and the third forwarding device on the first path;

generating, by the generating device, first forwarding information comprising first matching information and first operating information for the first forwarding device, wherein the first matching information comprises an identifier of a protocol of the first request message and a first identifier of the first content, the first operating information comprises operating instructions that instruct the first forwarding device to encapsulate a first label for a first data message to obtain a first encapsulation message after determining that the first data message matches the first matching information, and send the first encapsulation message via a first port, wherein the first port is an egress port of the first forwarding device on the first path, and the first label comprises a first protocol label corresponding to the protocol of the first request message and a first content label corresponding to the first identifier of the first content;

generating, by the generating device, second forwarding information comprising second matching information and second operating information for the second forwarding device, wherein the second matching information comprises the first label, the second operating information comprises operating instructions that instruct the second forwarding device to forward the first encapsulation message via a second port after receiving the first encapsulation message encapsulated with the first label, and the second port is an egress port of the second forwarding device on the first path;

generating, by the generating device, third forwarding information comprising the second matching information and third operating information for the third forwarding device, wherein the third operating information comprises operating instructions that instruct the third forwarding device to obtain, by de-encapsulation, the first data message encapsulated in the first encapsulation message and carrying the first content after receiving the first encapsulation message encapsulated with the first label, and send the first data message to the first network element via a third port;

sending, by the generating device, the first forwarding information to the first forwarding device;
sending the second forwarding information to the second forwarding device; and
sending the third forwarding information to the third forwarding device.

5. The method of claim 4, further comprising:
receiving, by the generating device, a second request message used for requesting the first content for a third network element, wherein the second request message comprises the first content identifier;
determining, by the generating device, that the second network element is the provider of the first content according to the first registration information;
determining, by the generating device, a second path from the second network element to the third network element according to the network topology, wherein the second path comprises a fourth forwarding device, a fifth forwarding device, and a sixth forwarding device, wherein the fourth forwarding device is a forwarding device adjacent to the second network element on the second path, the sixth forwarding device is a forwarding device adjacent to the third network element on the second path, and the fifth forwarding device is a forwarding device located between the fourth forwarding device and the sixth forwarding device on the second path;
generating, by the generating device, fourth forwarding information comprising fourth matching information and fourth operating information for the fourth forwarding device, wherein the fourth matching information comprises an identifier of a protocol of the second request message and a second identifier of the first content, the fourth operating information comprises operating instructions that instruct the fourth forwarding device to encapsulate a second label for a second data message to obtain a second encapsulation message after determining that the second data message matches the second matching information, and send the second encapsulation message via a fourth port, wherein the fourth port is an egress port of the fourth forwarding device on the second path, the second label comprises a second protocol label corresponding to the identifier of the protocol of the second request message and a second content label corresponding to the second identifier of the first content, the first identifier of the first content is different from the second identifier of the first content, and the first content label is different from the second content label;
generating, by the generating device, fifth forwarding information comprising fifth matching information and fifth operating information for the fifth forwarding device, wherein the fifth matching information comprises the second label, the fifth operating information comprises operating instructions that instruct the fifth forwarding device to forward the second encapsulation message via a fifth port after receiving the second encapsulation message encapsulated with the second label, and the fifth port is an egress port of the fifth forwarding device on the second path; and
generating, by the generating device, sixth forwarding information comprising the fifth matching information and sixth operating information for the sixth forwarding device, wherein the sixth operating information comprises operating instructions that instruct the sixth forwarding device to obtain, by de-encapsulation, the second data message encapsulated in the second encapsulation message and carrying the first content after receiving the second encapsulation message encapsulated with the second label, and send the second data message to the third network element via a sixth port.

6. The method of claim 4, wherein the first forwarding device and the fourth forwarding device are identical.

7. The method of claim 4, wherein the first forwarding device and the fourth forwarding device are different.

8. A controller, comprising a receiver, a transmitter, and a processor, wherein:
the receiver is configured to receive from a third forwarding device a first request message used for requesting a first content for a first network element, wherein the first request message comprises a first content identifier;
the processor is configured to:
determine that a second network element is a provider of the first content according to first registration information, wherein the first registration information comprises information indicating that the second network element is the provider of the first content, the first registration information comprises the first content identifier;
determine a first path from the second network element to the first network element according to a network topology, wherein the first path comprises a first forwarding device, a second forwarding device, and the third forwarding device, wherein the first forwarding device is a forwarding device adjacent to the second network element on the first path, the third forwarding device is a forwarding device adjacent to the first network element on the first path, and the second forwarding device is a forwarding device located between the first forwarding device and the third forwarding device on the first path;
generate first forwarding information comprising first matching information and first operating information for the first forwarding device, wherein the first matching information comprises an identifier of a protocol of the first request message and a first identifier of the first content, and the first operating information comprises operating instructions that instruct the first forwarding device to encapsulate a first label for a first data message to obtain a first encapsulation message after determining that the first data message matches the first matching information;
send the first encapsulation message via a first port, wherein the first port is an egress port of the first forwarding device on the first path, and the first label comprises a first protocol label corresponding to the protocol of the first request message and a first content label corresponding to the first identifier of the first content;
generate second forwarding information comprising second matching information and second operating information for the second forwarding device, wherein the second matching information comprises the first label, the second operating information comprises operating instructions that instruct the second forwarding device to forward the first encapsulation message via a second port after receiving the first encapsulation message encapsulated with the first label, and the second port is an egress port of the second forwarding device on the first path; and
generate third forwarding information comprising the second matching information and third operating information for the third forwarding device, wherein the third operating information comprises operating instructions that instruct the third forwarding device to obtain, by de-encapsulation, the first data message encapsulated in the first encapsulation message and carrying the first content after receiving the first encapsulation message encapsulated with the first label, and sending the first data message to the first network element via a third port; and the transmitter is configured to send the first forwarding information to the first forwarding device, send the second forwarding information to the second forwarding device, and send the third forwarding information to the third forwarding device.

9. The controller of claim 8, wherein:

the receiver is further configured to receive a second request message used for requesting the first content for a third network element, wherein the second request message comprises the first content identifier;

the processor is further configured to:
  determine that the second network element is the provider of the first content according to the first registration information;
  determine a second path from the second network element to the third network element according to the network topology, wherein the second path comprises a fourth forwarding device, a fifth forwarding device, and a sixth forwarding device, wherein the fourth forwarding device is a forwarding device adjacent to the second network element on the second path, the sixth forwarding device is a forwarding device adjacent to the third network element on the second path, and the fifth forwarding device is a forwarding device located between the fourth forwarding device and the sixth forwarding device on the second path;
  generate fourth forwarding information comprising fourth matching information and fourth operating information for the fourth forwarding device, wherein the fourth matching information comprises an identifier of a protocol of the second request message and a second identifier of the first content, the fourth operating information comprises operating instructions that instruct the fourth forwarding device to encapsulate a second label for a second data message to obtain a second encapsulation message after determining that the second data message matches the second matching information;
  send the second encapsulation message via a fourth port, wherein the fourth port is an egress port of the fourth forwarding device on the second path, the second label comprises a second protocol label corresponding to the identifier of the protocol of the second request message and a second content label corresponding to the second identifier of the first content, the first identifier of the first content is different from the second identifier of the first content, and the first content label is different from the second content label;
  generate fifth forwarding information comprising fifth matching information and fifth operating information for the fifth forwarding device, wherein the fifth matching information comprises the second label, the fifth operating information comprises operating instructions that instruct the fifth forwarding device to forward the second encapsulation message via a fifth port after receiving the second encapsulation message encapsulated with the second label, and the fifth port is an egress port of the fifth forwarding device on the second path; and
  generate sixth forwarding information comprising the fifth matching information and sixth operating information for the sixth forwarding device, wherein the sixth operating information comprises operating instructions that instruct the sixth forwarding device to obtain, by de-encapsulation, the second data message encapsulated in the second encapsulation message and carrying the first content after receiving the second encapsulation message encapsulated with the second label, and sending the second data message to the third network element via a sixth port.

10. The controller of claim 9, wherein the first forwarding device and the fourth forwarding device are identical.

11. The controller of claim 9, wherein the first forwarding device and the fourth forwarding device are different.

12. A server, comprising a receiver, a transmitter, and a processor, wherein:

the receiver is configured to receive from a controller a first request message used for requesting a first content for a first network element, wherein the first request message comprises a first content identifier;

the processor is configured to:
  determine that a second network element is a provider of the first content according to first registration information, wherein the first registration information comprises information indicating that the second network element is the provider of the first content, the first registration information comprises the first content identifier;
  determine a first path from the second network element to the first network element according to a network topology, wherein the first path comprises a first forwarding device, a second forwarding device, and a third forwarding device, wherein the first forwarding device is a forwarding device adjacent to the second network element on the first path, the third forwarding device is a forwarding device adjacent to the first network element on the first path, and the second forwarding device is a forwarding device located between the first forwarding device and the third forwarding device on the first path;
  generate first forwarding information comprising first matching information and first operating information for the first forwarding device, wherein the first matching information comprises an identifier of a protocol of the first request message and a first identifier of the first content, and the first operating information comprises operating instructions that instruct the first forwarding device to encapsulate a first label for a first data message to obtain a first encapsulation message after determining that the first data message matches the first matching information;
  send the first encapsulation message via a first port, wherein the first port is an egress port of the first forwarding device on the first path, and the first label comprises a first protocol label corresponding to the protocol of the first request message and a first content label corresponding to the first identifier of the first content;
  generate second forwarding information comprising second matching information and second operating information for the second forwarding device, wherein the second matching information comprises the first label, the second operating information comprises operating instructions that instruct the second forwarding device to forward the first encapsulation message via a second port after receiving the first encapsulation message encapsulated with the first label, and the second port is an egress port of the second forwarding device on the first path; and generate third forwarding information comprising the second matching information and third operating information for the third forwarding device, wherein the third operating information comprises operating instructions that instruct the third forwarding device to obtain, by de-encapsulation, the first data message encapsulated in the first encapsulation message and carrying the first content after receiving the first encapsulation message encapsulated with the first label, and sending the first data message to the first network element via a third port; and the transmitter is configured to send the first forwarding information, the second forwarding information, and the third forwarding information to the controller.

13. The server of claim 12, wherein:

the receiver is further configured to receive a second request message used for requesting the first content for a third network element, wherein the second request message comprises the first content identifier; and the processor is further configured to:

determine that the second network element is the provider of the first content according to the first registration information;

determine a second path from the second network element to the third network element according to the network topology, wherein the second path comprises a fourth forwarding device, a fifth forwarding device, and a sixth forwarding device, wherein the fourth forwarding device is a forwarding device adjacent to the second network element on the second path, the sixth forwarding device is a forwarding device adjacent to the third network element on the second path, and the fifth forwarding device is a forwarding device located between the fourth forwarding device and the sixth forwarding device on the second path;

generate fourth forwarding information comprising fourth matching information and fourth operating information for the fourth forwarding device, wherein the fourth matching information comprises an identifier of a protocol of the second request message and a second identifier of the first content, the fourth operating information comprises operating instructions that instruct the fourth forwarding device to encapsulate a second label for a second data message to obtain a second encapsulation message after determining that the second data message matches the second matching information;

send the second encapsulation message via a fourth port, wherein the fourth port is an egress port of the fourth forwarding device on the second path, the second label comprises a second protocol label corresponding to the identifier of the protocol of the second request message and a second content label corresponding to the second identifier of the first content, the first identifier of the first content is different from the second identifier of the first content, and the first content label is different from the second content label;

generate fifth forwarding information comprising fifth matching information and fifth operating information for the fifth forwarding device, wherein the fifth matching information comprises the second label, the fifth operating information comprises operating instructions that instruct the fifth forwarding device to forward the second encapsulation message via a fifth port after receiving the second encapsulation message encapsulated with the second label, and the fifth port is an egress port of the fifth forwarding device on the second path; and generate sixth forwarding information comprising the fifth matching information and sixth operating information for the sixth forwarding device, wherein the sixth operating information comprises operating instructions that instruct the sixth forwarding device to obtain, by de-encapsulation, the second data message encapsulated in the second encapsulation message and carrying the first content after receiving the second encapsulation message encapsulated with the second label, and sending the second data message to the third network element via a sixth port.

14. The server of claim 12, wherein the first forwarding device and the fourth forwarding device are identical.

15. The server of claim 12, wherein the first forwarding device and the fourth forwarding device are different.

* * * * *